United States Patent [19]

Valentine et al.

[11] 4,261,738
[45] Apr. 14, 1981

[54] PROCESS FOR RECOVERING PRECIOUS METALS FROM BIMETALLIC MATERIAL

[75] Inventors: James R. Valentine, Reading; Ravindra M. Nadkarni, Arlington, both of Mass.

[73] Assignee: Arthur D. Little, Inc., Cambridge, Mass.

[21] Appl. No.: 81,006

[22] Filed: Oct. 1, 1979

[51] Int. Cl.³ .............................................. C22B 11/04
[52] U.S. Cl. .................................. 75/103; 75/101 R; 75/117; 75/118 R; 75/119; 75/120; 75/121; 423/32
[58] Field of Search ..................... 75/103, 121, 118 R, 75/120, 119, 117, 101 R; 432/32

[56] References Cited

U.S. PATENT DOCUMENTS

| | | | |
|---|---|---|---|
| 1,622,960 | 3/1927 | Meyer | 75/118 R X |
| 2,647,829 | 8/1953 | McGauley et al. | 75/103 |
| 2,698,220 | 12/1954 | Erskine | 75/103 X |
| 2,807,533 | 9/1957 | Abramson | 75/103 X |
| 3,163,524 | 12/1964 | Weisbery et al. | 75/103 |
| 3,577,325 | 5/1971 | Fairchild | 75/118 R X |

Primary Examiner—G. Ozaki
Attorney, Agent, or Firm—Bessie A. Lepper

[57] ABSTRACT

Process and apparatus for recovering a precious metal, either as pure metal or in alloyed form, from a bimetallic material in which the precious metal is mechanically bonded to a base material comprising at least one base metal, e.g., copper, brass or bronze. The base material is leached off with an ammoniacal solution of an ammonium salt, preferably ammonium carbonate, using a leaching liquid containing reactive oxygen. The base metal or metals are recovered as metal compounds by thermally decomposing the resulting pregnant leach liquor; and the ammonia and ammonium salt are reconstituted for recycling. The method and apparatus are particularly suited for recovering karat gold from filled gold scrap.

55 Claims, 5 Drawing Figures

PROCESS FOR RECOVERING PRECIOUS METALS FROM BIMETALLIC MATERIAL

This invention relates to the recovery of precious metals from scrap materials and more particularly to the recovery of silver, gold, and platinum group metals (including platinum, palladium, rhodium, iridium, osmium and ruthenium) from scrap materials containing a base metal mechanically bonded to the precious metal.

In fabricating a number of different, relatively high-cost metallic items such as jewelry, precious metals, either as the pure metals or as appropriate alloys, are mechanically bonded to one or more base metals or base metal alloys to form the metal stocks from which the items are cut or otherwise fabricated. Such metal stocks, hereinafter termed "bimetallic" materials to distinguish them from alloys, have the precious metal adhered to one or more of their surfaces. In addition to jewelry, such bimetallic stock may be used in making table flatware, electronic circuit components, machine parts, catalysts and the like. The formation of such items gives rise to scrap material of varying sizes, shapes and layered constructions. It is, of course, economically necessary to recover at least the precious metals from such scrap.

So-called gold filled materials used in making jewelry may be considered to be illustrative of the type of material from which a precious metal is recovered in accordance with this invention. Blanks or metallic stock of the gold filled material are formed by mechanically bonding flat plates of karat gold to one or both sides of a flat plate of a base metal or base alloy—copper, brass or bronze being the most commonly used base materials. The bonding is normally accomplished by brazing with a silver solder with or without the incorporation of other interliners, such as nickel, in addition to the silver. The resulting bimetallic materials are then cold rolled to the desired thickness to form the blanks which may, if required, be further formed into tubing, wire or the like. The various unit pieces for making the jewelry are cut from these gold filled blanks leaving scrap pieces in many sizes and configurations.

In recovering the gold from the scrap it is highly desirable to be able to recover it in the form in which it was used to make the filled gold blanks. Generally, so-called "karat" gold, i.e., a gold alloy, is used for this purpose, the number of karats specified being a measure of the amount of gold present based upon conventional use of 24 karats to indicate pure gold. It is also highly desirable to be able to recover the metal components of the base material and of any solder and interliner used.

At present, the most widely used procedure for recovering gold and copper from such scrap comprises the electrorefining of the copper followed by the electrowinning of the gold from the insoluble slime produced in the copper electrorefining. Briefly, the scraps of the gold filled material are melted down to form an alloy, the principal constituent of which is copper. This alloy is then used as an anode in an electrolytic cell having a sulfuric acid/copper sulfate solution as the electrolyte. The initial cathode of the cell is high purity copper on which is plated additional, essentially pure copper electrochemically dissolved from the anode into the electrolyte. The gold, which is insoluble in the electrolyte, falls off at the anode as a fine mud or slime. After separation from the electrolyte, the gold is melted down to flux out selenium and tellurium impurities and it is then subjected to an electrowinning process to separate it from any silver. The recovered gold, which is essentially pure metal must then be realloyed to form the desired karat gold, e.g. 10- or 14-karat gold, before it can be used in the formation of additional gold filled blanks.

This prior art procedure for recovering the gold is relatively complicated and requires a combination of widely varying types of equipment including several different melting furnaces for melting down the scrap, for fluxing out the gold impurities and for realloying the recovered gold; molds to cast the anodes; and electrolytic cells with their attendant electrical lines and controls for electrorefining and electrowinning. Thus this procedure does not lend itself to the on-side recovery of the gold; but essentially mandates that the scrap be sent out for processing. In addition to the need for using all of these equipment components, the prior art process requires a relatively large amount of energy in the form of heat and electricity.

Further illustrations of bimetallic materials include sterling silver, and various platinum group metals either in pure form or alloyed with other metals from the platinum group or with other suitable metals, bonded to base metals to form metallic stock from which jewelry and other objects are formed. As in the case of the karat gold, the other precious metals are normally recovered from the scrap, by electrolytic processes, as the pure metal and then realloyed if necessary before being formed into the bimetallic materials.

Thus it is apparent that it would be desirable to have an improved, more direct and less expensive, process and apparatus for recovering precious metals from bimetallic materials, and especially from such scrap materials.

It is therefore a primary object of this invention to provide an improved process for recovering precious metals from bimetallic materials and particularly scrap stock, the process being one which is relatively simple, which requires no complicated controls and which is amenable to on-site processing of the scrap or other material. Another object is to provide a process of the character described which makes it possible to recover the precious metal in essentially the same form in which it existed in the stock material, thus in the case of precious metal alloys eliminating the need for realloying them prior to their reuse in forming additional stock material from the recovered metals. An additional object of this invention is to provide a process of the character described which can be carried out at ambient pressure and at temperatures between ambient and 80° C. and under conditions to eliminate or minimize operational hazards and environmental pollution.

It is another primary object of this invention to provide an improved process for recovering gold from bimetallic materials, the process being one which is relatively simple, which requires no complicated controls and which is amenable to on-site processing of the scrap. It is another object of this invention to provide a process of the character described which recovers gold from gold filled scrap as karat gold useable directly in the formation of gold filled blanks and hence which eliminates the step of realloying.

It is still another object to provide a process of the character described which makes it possible to recover valuable by-product copper as well as other metals and to recycle the reactants within a closed loop system.

It is another primary object of this invention to provide apparatus for the recovery of precious metals from bimetallic material. A further object is to provide apparatus of the character described which is relatively simple to operate, which provides a closed loop system that minimizes environmental problems and that requires less energy than the apparatus which is now used extensively for the same purpose.

Other objects of the invention will in part be obvious and will in part be apparent hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the following drawings in which.

According to one aspect of this invention there is provided a process for recovering a precious metal in pure or alloyed form from bimetallic material, comprising the steps of leaching a bimetallic material, formed by mechanically bonding a precious metal in pure or alloyed form to a metallic base material comprising at least one base metal, with an aqueous leaching liquid comprising an ammonium salt, formed of an acid essentially free from ions which complex with the precious metal, in an ammoniacal solution containing reactive oxygen thereby to form an aqueous pregnant leach liquor containing the base metal as a soluble ammine complex and to leave the precious metal essentially unchanged from the form in which it existed in the bimetallic material; removing the precious metal from the pregnant leach liquor; thermally decomposing the pregnant leach liquor to precipitate the base metal as a recoverable base metal compound and form a condensable vapor; condensing the vapor to recover ammonia; recovering a precursor used in forming the ammonium salt; and recovering the base metal compound.

In the preferred embodiment of this process, the ammonium salt is ammonium carbonate, the reactive oxygen is supplied by sparging air, oxygen or a mixture of air and oxygen into the leach liquid and the thermal decomposition is effected by injecting steam into the pregnant leach liquor.

According to another aspect of this invention there is provided an apparatus for recovering a precious metal in pure or alloyed form from a bimetallic material in which said precious metal is mechanically bonded to a base material comprising at least one base material, comprising in combination leach reactor means; means to supply to the leach reactor means the bimetallic material, an aqueous leach liquid, and reactive oxygen; means associated with the leach reactor means to maintain effective mass transfer between the leach liquid, the oxygen and the base material thereby to form a pregnant leach liquor containing the base metal in solution; means to separate the precious metal from the pregnant leach liquor; decomposition reactor means; means to convey the pregnant leach liquor from the leach reactor means to the decomposition reactor means; heating means associated with the decomposition reactor means to supply heat for the thermal decomposition of the pregnant leach liquor to form condensable vapors and to precipitate the base metal as a recoverable solid; and condensing means to condense the vapors.

In the following detailed description of this invention, the recovery of karat gold will be used to illustrate these process and apparatus aspects. In addition to the specific examples directed to the recovery of karat gold, Example 3 is included to illustrate the use of the process and apparatus in recovering sterling silver. As will be apparent from the following detailed description of this invention, those precious metals making up the platinum group, i.e., palladium, rhodium, iridium, osmium and ruthenium along with their alloys, which are insoluble in the ammoniacal leach liquid may also be recovered by this process. Although the base metals to which the precious metals are mechanically bonded in forming the bimetallic stock are usually copper, brass or bronze, they may be any metallic material which comprises at least one metal which is soluble in the leach liquid. In those cases wherein the metallic material comprises two or more base metals both may be soluble (e.g., copper and zinc in brass) or one may be insoluble and form a slime (e.g., copper and tin in bronze).

Figure 1:
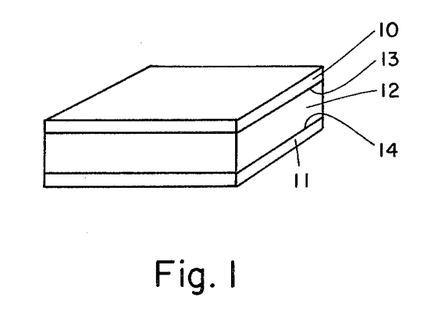
FIGS. 1-3 are much enlarged perspective views of three forms of gold filled scrap referred to as double plate, single plate and tubing, respectively.
Figure 2:
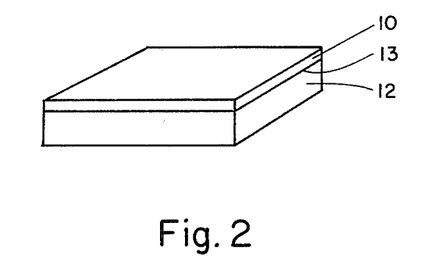
Figure 3:
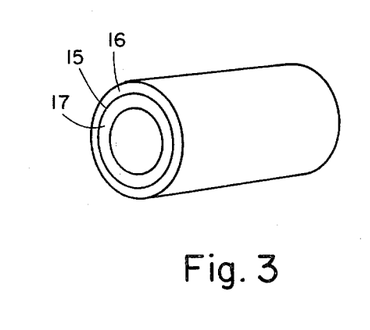

Filled gold may take one of several forms, three typical forms being illustrated in greatly enlarged drawings in FIGS. 1-3. As shown in FIG. 1, the so-called double-plate scrap form of filled gold comprises two thin outside layers 10 and 11 of karat gold, e.g., 8-karat and above, mechanically bonded (as distinguished from alloyed with) to an inner layer 12 of a base material using very thin layers of silver solder 13 and 14, along with optional additional thin interliners, for example of nickel.

In the single-plate form illustrated in FIG. 2 only one layer 10 of karat gold is used; and in FIG. 3 it will be seen that the tubing blank is formed with an outer layer 15 of karat gold bonded through a solder 16 to a base tubing 17. As will be shown in the examples, the process of this invention is applicable to all of these forms, even though that of FIG. 1 offers a relatively small surface area of the base metal for reaction with the leach liquor.

The base material is most commonly brass comprising a major portion of copper, e.g., at least about 60%, alloyed with zinc. Unalloyed copper and bronze, comprising at least 90% copper alloyed with tin, as well as the other brasses, bronzes, German silvers, babbitts and the like, may also be used. Since the separating of the gold or other precious metal from the base material is accomplished by reacting the base metals with an ammonium salt in an aqueous ammoniacal solution, it is preferable, in order to achieve acceptable reaction rates, that a surface of the base material be directly exposed to the leaching liquid. This requirement is met in the case of the filled gold, for the scrap pieces are configured to present exposed base material surfaces. In the case of the double-plate scrap illustrated in FIG. 1 it may be preferable to cut or shear larger pieces into smaller pieces or strips for processing, in which case it has been found that the resulting cut or sheared edges are not blocked by thin smears of gold.

Figure 4:
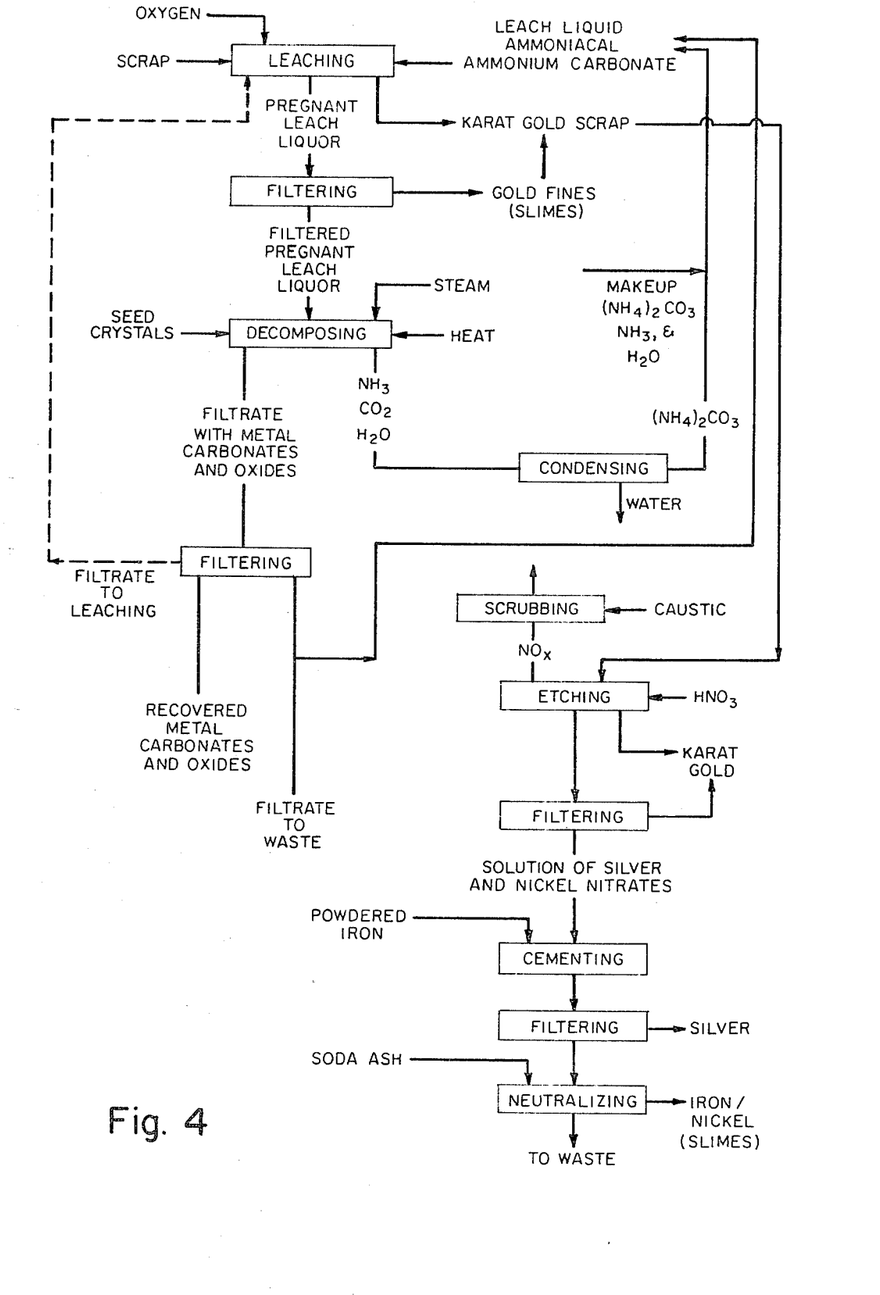
FIG. 4 is a flow diagram of the process of the invention.
Figure 5:
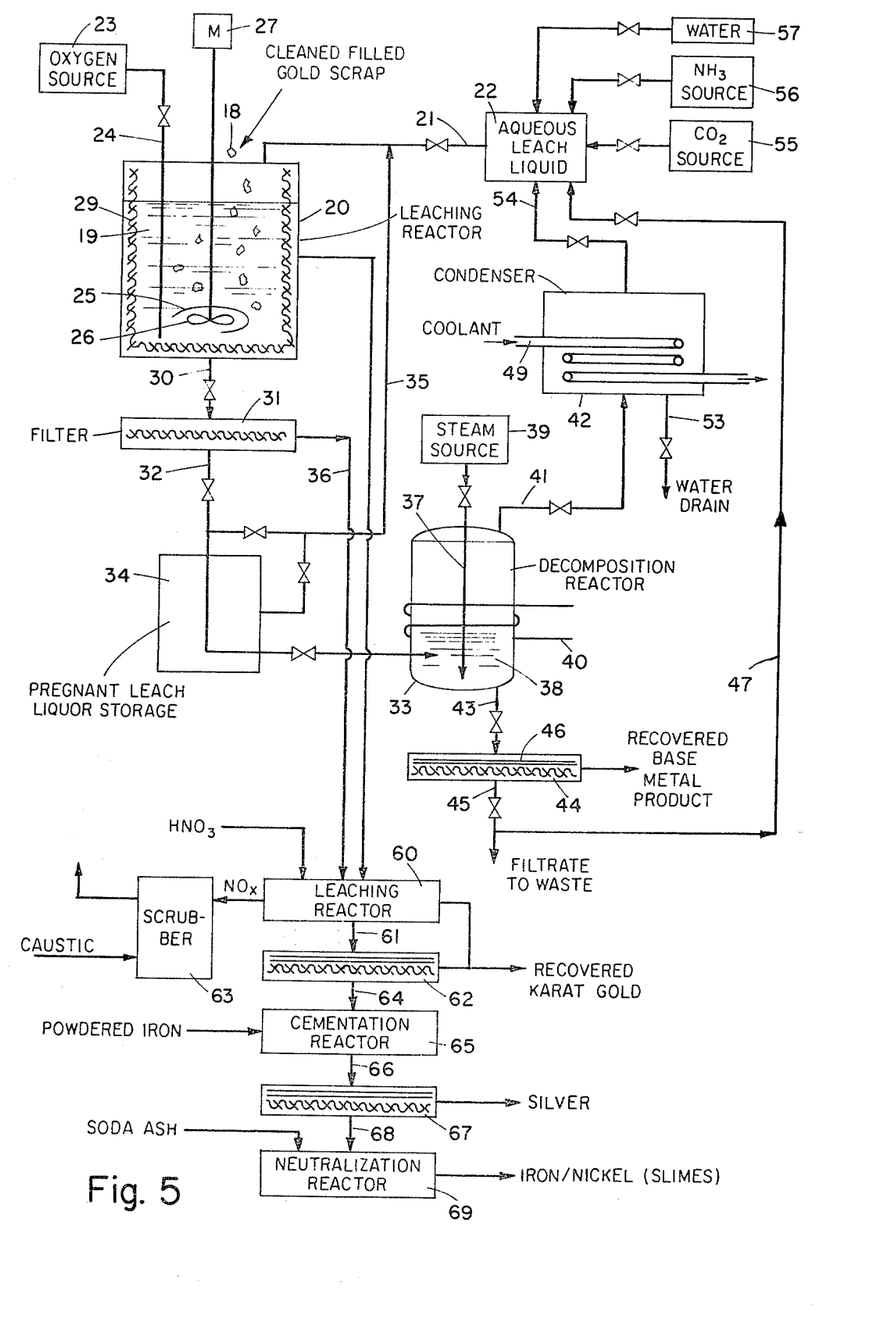
FIG. 5 illustrates the apparatus of this invention in somewhat diagrammatic form.

The process of this invention involves three primary steps—leaching, decomposing of the leach liquor and condensation of the vapor products of decomposition. Associated with these three primary steps are concomitant steps of separating the various products of these steps. The following detailed description of the process and apparatus is therefore presented in terms of these three principal steps using as an example filled gold scrap made with a brass base material silver-soldered to the gold, and an aqueous ammoniacal ammonium carbonate as the leach liquid. Alternative ammonium salts for the leach liquid will be listed with the understanding that the chemistry outlined for the three steps is comparable for that given for ammonium carbonate and need not be written out in detail. Reference should be had to FIGS. 4 and 5 in the following detailed description.

LEACHING

The purpose of the leaching step is to separate the metals of the base material from the precious metal without effecting any reaction with or changing the composition of the precious metal, e.g., karat gold. Such separation must include essentially solubilizing at least one metal of the base material. This solubilizing is accomplished by reacting the base metal or metals with an aqueous ammoniacal solution of an ammonium salt formed with an acid essentially free from anions which complex with gold or other precious metal being recovered. Thus, in the case of gold and the platinum group metals, ammonium sulfate, nitrate or phosphate may be used in place of the preferred carbonate. Ammonium chloride is, however, not preferred for this purpose. In the case of silver, only ammonium carbonate is suitable. However, ammonium carbonate is preferred in all cases since it minimizes problems in handling, recovering and recycling and hence in toxicity and pollution control.

During the leaching step, those base metals which are not dissolved in the ammoniacal solution of the ammonium salt form a slime, that is a fine powder suspension, in the pregnant leach liquor resulting from the leaching. Exemplary of such metals forming a slime are tin in bronzes and babbitt metals, lead in bronzes, brasses and German silvers, and antimony in brasses.

Reactive oxygen must be supplied during this leaching step and it is preferably provided by sparging oxygen, air or a mixture of oxygen and air into the leaching liquid. There is little difference in the reaction rate between using air or oxygen as long as sufficient oxygen is supplied for the oxidation of cuprous to cupric. If air is used, it may be necessary to vent the nitrogen through the condenser to recover any free ammonia.

The overall reactions for the leaching step (using a brass base material) may be written as follows:

$$Cu(metal) + 4NH_3 + \tfrac{1}{2}O_2 + H_2O = Cu(NH_3)_4^{+2} + 2OH^- \quad (1)$$

$$Zn(metal) + 4NH_3 + \tfrac{1}{2}O_2 + H_2O = Zn(NH_3)_4^{+2} + 2OH^- \quad (2)$$

It will be seen that the result of leaching is the formation of an aqueous solution containing the reactive metals forming the base material as soluble ammine complexes and any unreactive base metal or metals as an insoluble slime. The leaching reaction is autocatalytic as illustrated in the case of copper by the following reactions:

$$Cu(metal) + Cu(NH_3)_4^{+2} = 2Cu(NH_3)_2^+ \quad (3)$$

$$2Cu(NH_3)_2^+ + \tfrac{1}{2}O_2 + 4NH_3 + H_2O = 2Cu(NH_3)_4^{+2} + 2OH^- \quad (4)$$

As will be seen in FIGS. 4 and 5, leaching is carried out by introducing the filled gold scrap pieces 18 (FIG. 5) into the leach liquid 19 contained within a leach reactor 20 which is shown in FIG. 5 as a continuous stirred tank reactor. The gold scrap is preferably washed and/or degreased prior to its introduction into the leach reactor 20. The aqueous leach liquid is supplied by way of conduit 21 from a leach liquid supply 22; and oxygen from a source 23, e.g., an air compressor or oxygen cylinder, is introduced through line 24 below the surface of liquid 19, for example through a sparger ring 25 near the bottom of the reactor. Leach reactor 20 is shown to be equipped with a stirrer 26, driven by a motor 27, and it will normally also have baffles (not shown) to ensure thorough contacting of the scraps by the leach liquid. A wire basket 29, lining the internal walls of reactor 20, is so designed that it may be periodically withdrawn from the reactor by any suitable means (not shown) to remove the recovered gold therefrom. It is, of course, possible to employ other suitable equipment for withdrawing the recovered gold pieces from reactor 20, such as by suspending them on lines or threads which are inert to the leaching liquid and pulling them out. It is also within the scope of this invention to substitute for stirrer 26 any other suitable means to maintain effective mass transfer between the leach liquid, containing the oxygen, and the base metals to prevent the formation of stagnant pools of leach liquid. Such stagnant pools tend to accumulate copper (and zinc) and to deplete themselves of $NH_3$ and $CO_2$. This, in turn, promotes the formation of CuO and $Cu_2O$ films on the base metal surfaces with the resultant slowing down of the reaction rate.

Leach reactor 20 may also be a rotating drum reactor provided the scrap pieces being processed are not of a size or configuration which would form tangled masses in a rotating device. In some cases it may also be possible to use a reactor in which the scrap remains stationary and the leach liquid is circulated around or sprayed onto the metallic surfaces provided that essentially all of the scrap is continuously wetted and the formation of stagnant pools of leach liquid is minimized.

The leaching step may be carried out over a relatively wide temperature range, i.e., between about 20° C. and about 80° C. The preferred range is between about ambient and about 40° C. Increasing the leaching temperature does, of course, increase the rate of the reaction; but it is generally preferable to balance any increased reaction rate against increased loss of ammonia and carbon dioxide through vaporization. Minimizing such vaporization is not only economically feasible it is also necessary in the case of ammonia to prevent pollution of the surrounding atmosphere.

Although higher than ambient pressures may be used, ambient pressure is preferred from both an equipement and operational point of view. The combination of ambient temperature, or slightly higher, and ambient pressure is quite satisfactory in recovering karat gold by this process; and it offers the easiest conditions to handle. However, any combination of temperature and pressure may be used so long as no appreciable decomposition of the leach liquid takes place during the actual leaching step.

The leaching step is carried out until all of the base metal is dissolved and the karat gold remains. Normally, the karat gold will carry on its bonding surface essentially all of the silver used as solder and at least a portion of any nickel interliner which may have been used in bonding the gold to the base material in forming the filled gold. The silver and any nickel may readily be removed from the karat gold by treatment with nitric acid as described below.

Inasmuch as it is desired to react all of those base metals which form the soluble ammine complexes as rapidly as is possible under the temperature and pressure conditions chosen, it is desirable to prevent the formation of other reaction products, namely $CuCO_3$ which is precipitated out of the leach liquor and $Cu_2O$ and $CuO$ (also $ZnO$) which form as films on the copper (or zinc) and slow down the reaction rate. The desired results are attained through control of the pH of the leaching liquid and of the ionic concentrations prevailing therein.

The leach liquid must be alkaline, but it should not have a pH greater than about 11.5, a level above which oxide formation on the copper is promoted. The preferred pH range is therefore from about 8 to 10.

Sufficient ammonia must be provided to hold the copper (and zinc) in solution as $Cu(NH_3)_4^{+2}$ (or $Zn(NH_3)_4^{+2}$) to complete reaction (1). Excess ammonia preferred to prevent formation of $CuO$ and $Cu_2O$ as long as the pH is maintained within the specified range. The role of the ammonium salt is that of a buffer to stabilize and control the pH and to increase the solubility of the metal complexes. Because ammonium carbonate decomposes completely to gases, is readily regenerated and is economical, it is the preferred ammonium salt in this role. It has been found that the total ammonia concentration in the leach liquid introduced into the leaching reactor may range between about 0.5 M and 10 M and the total carbonate concentration between about 0.1 M and 5 M.

The amounts of the three reagent components—oxygen, total ammonia and total carbonate—are preferably balanced to minimize film formation on the base material surfaces. For any given oxygen feed rate, the desired amounts of ammonia and carbonate can readily be determined. Generally, the ratio of total ammonia to total carbonate should range between about 2.5 and 5 with about 4 being preferred. Finally, within the concentration framework defined above, it should be noted that the higher levels of total ammonia and total carbonate permit the dissolution of more base metals per unit volume of leach soltution.

The concentration of total soluble copper in the pregnant leach liquor after completion of the reaction may approach or equal saturation under the conditions used. For ambient conditions this is about 2.4 M. Typically the molar ratio of total ammoina to total soluble copper in the pregnant leach liquor will be about 3 to about 7.

Although FIGS. 4 and 5 illustrate the leaching step as being carried out in one stage and as part of a batch process, it is within the scope of this invention to carry out the leaching in multiple stages and/or to make it part of a continuous process.

Once the leaching reaction has been completed, i.e., all of the soluble base metals have been solubilized and the insoluble metal or metals reduced to slime, the karat gold is removed, such as by withdrawing basket 29 from leach reactor 20, and the pregnant leach liquor containing the metal ammine complexes, in solution along with any finely divided slime-forming metals, is drained from leach reactor 20, taken through line 30 to a filter 31, where any gold fines and any insoluble base metal are removed, and then by way of line 32 to a decomposition reactor 33. In the preferred embodiment of this process, the pregnant leach liquor is drained through line 30 continuously and an equivalent quantity of aqueous leach liquid from storage vessel 22 is added continuously in order to maintain an optimum copper concentration within the leach reactor to promote autocatalytic dissolution of the base material. It may be preferably to interpose a pregnant leach liquor storage vessel 34 between filter 31 and decomposition reactor 34; and to maintain storage vessel 34 at an elevated temperature which is below that at which any decomposition occurs to precipitate out metal salts in the vessel.

Due to the autocatalytic nature of the leaching reaction, it may be found desirable to return a minor portion of the $Cu(NH_3)_4^{+2}$ from leach reactor 20 or pregnant leach liquor storage vessel 34 directly back to it. This may be done by way of line 35 which is in fluid communiction with reactor 20 by way of leach liquid inlet line 21.

If the base material contains one or more base metals, e.g., tin, lead, antimony and the like, which do not form ammine complexes and which are released into the pregnant leach liquor as finely divided material, i.e., slime, these insoluble materials may be separated along with the gold fines from the pregnant leach liquor in filter 31. The gold fines, with any finely divided base metal, are taken by conduit 36 into a reactor where these base metals along with solder and interliner remaining on the gold scrap, also conveyed to the reactor, are dissovled off as described below. It is also, of course, within the scope of this inventin to remove the base metal from the gold fines in any other suitable manner in separate equipment using any suitable acid or alkali solvent for the base metal or metals. The insoluble base metals in the form of slime may also be carried in the pregnant leach liquor into the decomposition reactor in which case they will be entrapped into the precipitated base metal compounds.

DECOMPOSING

In thermally decomposing the leach liquor, the base metals are converted to a manageable precipitate which is in a saleable form; and the reactant ammonia and carbon dioxide are recovered for condensing and reconversion to leach liquid. If a less volatile ammonium salt precursor other than carbon dioxide is used, it may be recovered in the decomposition filtrate and returned to the leach liquid. The decomposition step may be carried out in a manner to form primarily basic copper and zinc carbonates, in which case the following reactions occur:

By maintaing the decomposition temperature at or near the boiling point of the pregnant leach liquor under atmospheric pressure, reactions (5) and (6) go forward to produce a good quality product exhibiting the typical green coloration of malachite. However, prolonged boiling, and/or the use of high-pressure, high-temperature steam to effect the required thermal decomposition gives rise to cuprous and cupric oxides according to the following reactions:

$$CuCO_3 \cdot Cu(OH)_2 = 2CuO + CO_2 + H_2O \quad (7)$$

$$2ZnCO_3 \cdot 3Zn(OH)_2 = 5ZnO + CO_2 + 3H_2O \quad (8)$$

Since the oxides are major contributors to the formation of unwanted scale in the decomposition reactor, it is preferably to carry out the decomposition reaction in a manner to minimize oxide formation and maximize formation of the basic copper carbonates.

FIG. 5 illustrates the use of a boildown kettle as one preferred embodiment of a decomposition reactor 33. A steam sparge line 37 extends below the surface of the pregnant leach liquor 38 to introduce saturated steam at essentially atmospheric pressure from a steam source 39 into the pregnant leach liquor 38. Some external indirect heating of the leach liquor through the reactor walls, such as by circulating a heat transfer liquid, e.g., steam under moderate pressure, through coils 40 is desirable to minimize accumulation of steam condensate within the reactor. A submerged heater may be used in place of coils 40 to accomplish the same result.

A vapor withdrawal line 41 takes the vapor stream containing ammonia and carbon dioxide to the condenser 42 and a by-product withdrawal line 43 is provided to remove the by-product precipitated metallic compounds to a filter 44, such as a pressure leaf filter, where, with the draining off of the filtrate through line 45, a wet cake 46 is formed. This cake is a mixture of basic copper and zinc carbonates with some cuprous, cupric and zinc oxides. If some base metal slime was carried over in the pregnant leach liquor into the decompositon reactor, the finely divided slime particles will adhere to and be entrapped in the wet cake. The wet cake may be further processed in a smelter to recover copper and zinc along with any insolubilized base metal. The filtrate in line 45 may be discarded to a wastewater treatment plant when the preferred ammonium carbonate is used. However, when another less volatile ammonium salt precursor e.g., sulfuric acid is used, the acid in the filtrate may be returned by line 47 to leach liquid supply 22.

As previously noted, the required decomposition of the pregnant leach liquor is preferably carried out at a temperature which approximates the boiling temperature of the liquor, i.e., between about 90° C. and 100° C. The use of steam with a sparging action to heat the liquor within that temperature range results in the vaporization of $CO_2$, $NH_3$ and some water and in minimizing the formation of scale on the internal walls of the decomposition reactor.

The concentrations of the metal ammine complexes in the pregnant leach liquor at the beginning of the decomposition reactions may be up to the level of saturation, and a minor quantity of suspended solids may be tolerated. Where brass is the base material, the zinc is precipitated out prior to the copper, a fact which means that removal of essentially all of the copper ensures removal and recovery of such other metals. When bronze is the base material, the tin is obtained as a slime and is recovered in filter 31 and/or in the precipitated copper compounds as previously noted.

In place of the boildown kettle illustrated in FIG. 5, it is possible to use a boildown tank having plate coils through which high pressure steam, e.g., 30 psig, may be passed. This technique permits recovery of relatively undiluted ammonia and carbon dioxide; but it requires periodic removal of cupric oxide scale from the heating coils. Alternatively, submerged combustion may be used; but the by-product recovered is copper (and zinc) carbonate. This means that while the by-product carbon dioxide from the combustion is added to the vapor recovered, the percentage of recovered ammoina in the vapor is decreased because of dilution by flue gas. It is also possible to use a falling film evaporator or similar crystallization equipment as the decomposition reactor.

In addition to the use of direct steam sparging and control of the decomposition temperature, several additional techniques may be used to minimize scale formation within the decomposition reactor. Vigorous stirring accomplished by any suitable means, such as the stirrer with baffles used in leach reactor 20, may be used; and solid seeding material may be added to the reactor prior to the initiating of the decomposition. Although the decomposition reactor 33 can be run on a continuous feed basis, it is generally preferable to operate it as a batch reactor, adding the seeding material before the pregnant leach liquid. Better control of the decomposition reactions and hence over scaling can be achieved in this manner than when fresh pregnant leach liquor is being continuously added to reactor 33.

CONDENSING

In the preferred embodiment of this invention in which ammonium carbonate is used, the vapor from the decomposition reactor 33 is a mixture of steam, ammonia and carbon dioxide and the purpose of the condensing step is to remove excess water and form ammonium carbonate by the reaction $$CO_2 + H_2O + 2NH_3 = (NH_4)_2CO_3 \quad (9)$$

The excess water vapor is condensed to liquid and ammonium carbonate is formed. The condenser 42 used may be of the tube and shell type, wherein a coolant such as water is circulated through coils 49. The water condensate is withdrawn through line 53 and the product ammonium carbonate is conveyed through line 54 to the aqueous leach liquid tank 22. Makeup carbon dioxide, ammonia and water are supplied to the leach liquid as required from sources 55, 56 and 57, respectively.

The karat gold which is recovered after leaching has essentially the same physical form and shape as it had when present in the original bonded scrap material. Flat plates such as edge trimmings, whether chopped or folded, retain their flat configurations; and shell and tubing ends remain as tubes. The karat gold thus recovered has, moreover, essentially the same gold content as in the gold filled scraps from which it is recovered. This eliminates the need to realloy the gold and makes possible the melting down of the recovered karat gold for making gold filled blank stock directly.

RECOVERING INTERLINER MATERIALS

Usually in forming the bimetalic stock materials one or more metal solders or interliners are used. If these interliners, typically silver, nickel or a combination of silver and nickel, are used, they will adhere to the bonded side of the karat gold and it is necessary to remove them since they are not attacked by the leach liquor. In the case of silver and nickel, their removal from the karat gold is most conveniently done by leaching with nitric acid, a reaction which may also be used to remove any of the slime-forming base metals collected with the gold fines in filter 31.

The additional steps and apparatus components for removing any silver and/or nickel from the recovered karat gold are illustrated in FIGS. 4 and 5. Thus, as illustrated, the karat gold scrap from leach reactor 20 and the gold fines, along with any fine base metal, from filter 31 are combined and leached with the nitric acid in leaching reactor 60 to form a solution of silver and nickel nitrates which are conveyed through line 61 to a filter 62 where any remaining gold is collected. The karat gold taken from leaching reactor 60 and filter 62 consitutes the recovered karat gold resulting from the process. FIG. 5 shows a caustic scrubber 63 associated with leaching reactor 60 for removing any oxides of nitrogen before gas is discharged from reactor 60.

The mixed metallic nitrates making up the filtrate are conveyed by line 64 to a cementation reactor 65 into which powdered iron is added to precipitate the silver. The reaction liquor from the cementation reactor is taken by line 66 to filter 67 where the silver is removed and from which the filtrate is conveyed by line 68 to a neutralization reactor 69 wherein the nickel and iron ions in solution are precipitated out by the addition of soda ash to the filtrate solution. The recovery of the iron and nickel from the precipitate formed, as well as any other metals which may leached from the karat gold, e.g., those forming the slime, may be carried out using any other suitable metallurgical techniques known in the art.

Alternatively, if it is desired to selectively separate nickel from the silver and karat gold, this scrap may be heated in a reducing atmosphere to destroy the protective oxide film on the surface of the nickel interliner and the scrap may then be exposed to ammoniacal leach liquid to dissolve the nickel as a nickel ammine complex.

The process of this invention is further described in the following examples which are meant to be illustrative and not limiting.

EXAMPLES 1 AND 2

In the following examples a two-liter reaction vessel, having an electrical heating tape wrapped around the exterior of the reactor base and an outer layer of fiberglass insulation, was used as the leaching reactor. The vessel was equipped with a motor driven stirrer and baffles; and a sparger ring, located on the bottom, was connected to an air pump to supply oxygen to the leach liquid. The filled gold scrap pieces were individually held in a sample holder beneath the surface of the liquid to make it possible to remove them periodically for visual observation. In commercial operation the filled gold scrap could, of course, be allowed to move freely about in the leach liquid.

The ammoniacal ammonium carbonate leach solutions were prepared by dissolving the required amounts of ammonium bicarbonate and ammonium carbonate in the appropriate mixture of concentrated ammonium hydroxide (29 weight % $NH_3$) and tap water. Solutions containing known concentrations of dissolved copper were prepared by dissolving copper wire in fresh ammonia-ammonium carbonate solution or by diluting pregnant leach liquors from previous runs with fresh reagent.

Subsequent to setting up the reactor vessel, the leach liquor (normally one liter) was introduced and heated with gentle stirring. The measured and weighed sample pieces, affixed to their holders, were held above the surface of the leach liquid until it was saturated with oxygen by sparging air into it at essentially atmospheric pressure at a rate of 1.4 liters per minute. Then the samples were inserted to a depth and in a location such that the leach liquid was continuously circulated around them. The reactor was kept closed during the leaching step. Leaching began almost immediately and was continued until all of the base metal was dissolved.

The scrap test specimens were removed, immediately rinsed off in tap water, then dried and examined for appearance, dimensions and weight. All or portions of the test specimens and pregnant leach liquors were subjected to chemical analysis to determine the total amounts of gold, copper, silver, nickel and zinc. These determinations were made by D.C. plasma emission spectrometry using a Spectraspan Model III spectrometer. In this technique the sample solution (in an aqua regia mixture) is diluted, nebulized and introduced into a direct current discharge in an argon atmosphere. The intensities of selected lines in the resulting emission are measured photoelectrically. The particular emission lines chosen for each element are selected to provide minimum interelement interference. In addition, standards for the various analyte metals are prepared in appropriate matrices containing the other major elements. Cupric values were distinguished from cuprous using the well-known iodimetric method and total ammonia (ammonia plus ammonium ion) was determined by reaction with a known excess of hypobromite solution in a neutral buffered solution followed by the addition of a known amount of sodium arsenite and back titration of the sodium arsenite with additional bromide.

Using this test set-up and a leach liquor prepared as described, karat gold was successfully recovered from filled gold scrap material in the form of wire, shell ends, tubing blanks, single plate, edge trimmings of single plate and double plate scrap. Stirring rates at or above those at which the limiting mass transfer boundary layer was attained and oxygen flow rates at or greater than sufficient to provide the oxygen required to oxidize all of the cuprous to cupric copper were used. The total ammonia concentration in the leach liquid at the beginning of the leaching step was preferably about 8 moles/liter and carbonate concentration was provided at 2 and 3.2 moles/liter, 2 moles being preferred to provide an ammonia/carbonate ratio of 4. When the concentration of the dissolved $Cu^{+2}$ species was maintained at 1 gram/liter (0.02 mole/liter) or above the autocatalytic reaction mechanism predominated.

The following results are exemplary of those obtained using filled gold scraps in which 12-karat gold was bonded to brass serving as the base material. The scrap materials and resulting leach products were determined to have the compositons given in the following tabulation:

TABLE 1

Chemical Compositions of Typical 12-Karat Filled Gold Scrap and Leach Products (Weight Percent)

| Element | Single Plate (¼th 12-Karat Gold) | | Single Plate, Ni Interliner (1/20th 12-karat gold) | | |
|---|---|---|---|---|---|
| | Scrap | Leach Product | Scrap | Leach Product | After $HNO_3$ Leach |
| Gold | 13.7 | 48.8 | 2.3 | 28.9 | 48.8 |
| Copper | 75.9 | 39.2 | 82.9 | 22.7 | 37.2 |
| Zinc | 9.53 | 9.07 | 10.1 | 5.61 | * |
| Silver | 0.84 | 2.89 | 0.15 | 2.14 | 1.89 |
| Nickel | 0.01 | 0.02 | 2.87 | 36.9 | 0.02 |
| Karat | | | | | |

TABLE 1-continued

Chemical Compositions of Typical 12-Karat Filled Gold Scrap and Leach Products
(Weight Percent)

| | Single Plate (¼th 12-Karat Gold) | | Single Plate, Ni Interliner (1/20th 12-karat gold) | |
|---|---|---|---|---|
| Element | Scrap | Leach Product | Scrap | Leach Product | After HNO₃ Leach |
| value | | 11.7 | | | 11.7 |

*not determined

The recovered leach product from the single plate filled gold scrap without an interliner apparently had a small amount of silver solder adhering to it, the remaining being probably alloyed with the gold. Assuming that some of the silver and the nickel were removable, the karat value of the recovered gold would be very close to 12. Therefore, it can be said that the original karat gold was recovered in essentially the same form that it was present in the scrap. In the case of the single plate scrap with nickel interliner, once the nickel and the silver solder were etched off with nitric acid, the final recovered gold had a karat value approximating 12. Again, a very small amount of the silver solder may have remained adhered to the recovered gold.

EXAMPLE 3

645 grams of a bimetallic laminate sheet 3 mm thick and formed of 10 parts by weight of sterling silver (92.5% silver and 7.5% copper) brazed with silver solder to 90 parts by weight of red brass (90% copper and 10% zinc) was leached along with other bimetallic laminate materials in 12 liters of an ammoniacal ammonium carbonate leaching liquid having at total ammonia concentration of 8.4 moles/liter, a total carbonate concentration of 2.56 moles/liter and an initial copper concentration of 0.083 moles/liter. Leaching was carried out at ambient temperature (20° to 25° C.) and ambient pressure with a gas sparge (air with oxygen added) of 2 liters per minute. The leach liquid was moderately agitated to maintain a continuous flow of it over the laminate. Although leaching was continued for 32 hours, the brass layer was visually gone from the sterling silver layer prior to the time it was removed from the resulting pregnant leach liquor.

The sterling silver pieces recovered weighed 61.5 grams and had the same width and length dimensions as the original bimetallic pieces. These recovered pieces had a dull silver surface finish. A preliminary analysis of these sterling silver pieces gave 90.5% by weight silver and 6.7% by weight copper. Although the ratio of silver to copper in the recovered sterling did not correspond precisely to the original sterling, the addtional silver was apparently derived from the silver solder used.

Throughout the description of the invention the term "bimetallic" has been used to designate a metal laminate formed of at least one layer of a precious metal or precious metal alloy and a base material. Although the base material has been described, for convenience, in terms of constituting a single layer of the laminate, it will be apparent that multiple layers of base materials (either of the same or different composition) may form the base material, each of the layers preferably comprising at least one base metal which is soluble in and reactive with the leach liquid.

The method and apparatus of this invention make it possible to recover precious metals from bimetallic scrap in essentially the same form whether as pure metals or alloys, as they existed in the bimetallic material. The invention is particularly suited to the on-site recovery of karat gold from filled gold scrap.

It will thus be seen that the objects set forth above, among those made apparent from the preceding description, are efficiently attained and, since certain changes may be made in carrying out the above process and in the constructions set forth without departing from the scope of the invention, it is intended that all matter contained in the above description or shown in the accompanying drawings shall be interpreted as illustrative and not in a limiting sense.

We claim:

1. A process for recovering a precious metal in pure or alloyed form from bimetallic material, comprising the steps of
   (a) leaching a bimetallic material, formed by mechanically bonding a precious metal in pure or alloyed form to a metallic base material comprising at least one base metal, with an aqueous leaching liquid comprising an ammonium salt, formed of an acid essentially free from ions which complex with said precious metal, in an ammoniacal solution containing reactive oxygen thereby to form an aqueous pregnant leach liquor containing said base metal as a soluble ammine complex and to leave said precious metal essentially unchanged from the form in which it existed in said bimetallic material;
   (b) removing said precious metal from said pregnant leach liquor;
   (c) thermally decomposing said pregnant leach liquor to precipitate said base metal as a recoverable base metal compound and to form a condensable vapor; and
   (d) condensing said vapor to recover ammonia.

2. A process in accordance with claim 1 wherein said precious metal is silver, gold, or a platinum group metal.

3. A process in accordance with claim 1 wherein said base material is formed of one or more base metals, all of which form a soluble ammine complex in said leaching.

4. A process in accordance with claim 3 wherein said base material is brass and said base metals are copper and zinc.

5. A process in accordance with claim 1 wherein said base material is formed of a plurality of base metals, at least one of which forms a soluble ammine complex in said leaching.

6. A process in accordance with claim 5 wherein said base material contains at least one noncomplexing base metal which forms a slime in said pregnant leach liquor during said leaching.

7. A process in accordance with claim 6 wherein said base material is bronze and said base metals are copper and tin.

8. A process in accordance with claim 6 including the step of removing at least a portion of said slime from said pregnant leach liquor prior to thermally decomposing it.

9. A process in accordance with claim 1 wherein said ammonium salt is ammonium carbonate.

10. A process in accordance with claim 1 wherein said reactive oxygen is supplied by sparging air, oxygen or a mixture thereof into said leaching liquid.

11. A process in accordance with claim 1 wherein said leaching step comprises continuously supplying said aqueous leaching liquid to contact said bimetallic material and continuously draining off said aqueous pregnant leach liquor.

12. A process in accordance with claim 11 including the step of temporarily holding said pregnant leach liquor thereby to permit said step of thermally decomposing said pregnant leach liquor to be carried out batchwise.

13. A process in accordance with claim 1 including the step of adding a portion of said pregnant leach liquor to said aqueous leaching liquid.

14. A process in accordance with claim 1 wherein said leaching step is carried out at a temperature between about 20° C. and about 80° C. and at essentially ambient pressure; and said thermally decomposing step is carried out at a temperature between about 90° C. and about 100° C. and at essentially atmospheric pressure.

15. A process in accordance with claim 1 wherein said aqueous leaching liquid is alkaline; and has a total ammonia concentration ranging between about 0.5 M and about 10 M, a total carbonate concentration between about 0.1 M and about 5 M, and a ratio of total ammonia to total carbonate between about 2.5 and about 5.

16. A process in accordance with claim 1 including the step of adding solid seeding material to said pregnant leach liquor prior to said step of thermally decomposing it.

17. A process in accordance with claim 1 wherein said step of thermally decomposing said pregnant leach liquor comprises sparging with steam at essentially atmospheric pressure.

18. A process in accordance with claim 17 including the step of indirectly heating said pregnant leach liquor during said sparging.

19. A process in accordance with claim 1 including the steps of recovering said acid or a precursor thereof subsequent to said step of thermally decomposing said pregnant leach liquor; and of recovering said base metal compound.

20. A process in accordance with claim 1 including the steps of reacting said ammonia with said acid or said precursor; and forming said leaching liquid from the resulting reaction products.

21. A process in accordance with claim 20 wherein said precursor is carbon dioxide and said recovering step comprises removing carbon dioxide gas with said condensable vapor.

22. A process in accordance with claim 20 wherein said acid is essentially nonvolatile at the temperature of said decomposing step and said recovering step comprises separating said acid from the recovered base metal compound.

23. A process in accordance with claim 1 wherein said precious metal is bonded to said base material through a metallic solder, interliner or combination of both and said process includes the step of removing said metallic solder and interliner.

24. A process in accordance with claim 23 wherein said interliner comprises nickel and said step of removing said interliner comprises heating said bimetallic material in a reducing atmosphere to destroy the oxide film on said nickel prior to said leaching, whereby said nickel forms a soluble ammine complex during said leaching step.

25. A process in accordance with claim 23 wherein said step of removing said solder, interliner or combination of both comprises etching them off said precious metal removed from said pregnant leach liquor.

26. A process for recovering a precious metal in pure or alloyed form from bimetallic material, comprising the steps of
(a) contacting a bimetallic material, formed by mechanically bonding a precious metal in pure or alloyed form to a metallic base material comprising at least one base metal, with an aqueous leaching liquid comprising ammonium carbonate in an ammoniacal solution;
(b) during said contacting introducing reactive oxygen into said leaching liquid while continually agitating said leaching liquid thereby to form an aqueous pregnant leach liquor containing said at least one base metal as a soluble ammine complex and to leave said precious metal essentially unchanged from the form in which it existed in said bimetallic material;
(c) separating said precious metal from said pregnant leach liquor;
(d) thermally decomposing said pregnant leach liquor to precipitate said at least one base metal in the form of a recoverable solid and to form a condensable vapor, the conditions of said decomposing being such as to minimize the amount of any oxides of said at least one base metal and to maximize the amount of the basic carbonate of said at least one base metal in said recoverable solid; and
(e) condensing said vapor to remove water and to recover ammonia, carbon dioxide and ammonium carbonate for forming said aqueous leaching liquid.

27. A process in accordance with claim 26 wherein said precious metal is silver, gold or a platinum group metal.

28. A process in accordance with claim 27 wherein said precious metal is sterling silver.

29. A process in accordance with claim 27 wherein said precious metal is karat gold.

30. A process in accordance with claim 26 wherein said base material comprises a plurality of base metals.

31. A process in accordance with claim 30 wherein all of said base metals form soluble ammine complexes.

32. A process in accordance with claim 31 wherein said base material is brass, said base metals comprise copper and zinc and said soluble ammine complexes comprise cuprammine carbonate and zinc ammine carbonate.

33. A process in accordance with claim 32 wherein the molar ratio of total ammonia to total soluble copper is about 3 to about 7 in said pregnant leach liquid.

34. A process in accordance with claim 30 wherein said base material contains one or more noncomplexing base metals which form a slime in said pregnant leach liquor.

35. A process in accordance with claim 34 including the step of removing at least a portion of said slime from said pregnant leach liquor prior to thermally decomposing it.

36. A process in accordance with claim 34 wherein said base material is bronze, said base metals comprise copper and tin, said soluble amine complex comprises cuprammine carbonate and said slime comprises finely divided tin.

37. A process in accordance with claim 26 wherein said leaching step comprises continuously supplying said aqueous leaching liquid to contact said bimetallic material and continuously draining off said aqueous pregnant leach liquor.

38. A process in accordance with claim 37 including the step of temporarily holding said pregnant leach liquor thereby to permit said step of thermally decomposing said pregnant leach liquor to be carried out batchwise.

39. A process in accordance with claim 26 wherein said leaching step is carried out at a temperature between about 20° C. and about 80° C. and at essentially ambient pressure.

40. A process in accordance with claim 26 wherein said aqueous leaching liquid is alkaline; and has a total ammonia concentration ranging between about 0.5 M and about 10 M, a total carbonate concentration between about 0.1 M and about 5 M, and a ratio of total ammonia to total carbonate between about 2.5 and about 5.

41. A process in accordance with claim 26 including the step of adding to said leaching liquid an aqueous ammmoniacal solution of ammine carbonate to said at least one base metal.

42. A process in accordance with claim 41 wherein said pregnant leach liquor serves as said aqueous ammoniacal solution of said ammine carbonate.

43. A process in accordance with claim 26 wherein said step of introducing said reactive oxygen into said leaching liquid comprising sparging air, oxygen or a mixture thereof into said liquid thereby contributing to said agitating.

44. A process in accordance with claim 26 wherein said step of thermally decomposing is carried out at a temperature approximating the boiling point of said pregnant leach liquor and at essentially atmospheric pressure.

45. A process in accordance with claim 44 wherein said step of thermally decomposing said pregnant leach liquor comprises sparging steam into said liquor to heat it between about 90° C. and 100° C.

46. A process in accordance with claim 45 including the step of indirectly heating said liquor during said sparging.

47. A process in accordance with claim 26 including the step of adding solid seeding material to said pregnant leach liquor prior to thermally decomposing it.

48. A process in accordance with claim 26 including the step of reacting said ammonia and said carbon dioxide to form ammonium carbonate for use in said leaching liquid.

49. A process in accordance with claim 26 wherein said precious metal is bonded to said base material through a metallic solder, interliner or combination of both and said process includes the step of removing said metallic solder and interliner.

50. A process in accordance with claim 49 wherein said interliner comprises nickel and said step of removing said interliner comprises heating said bimetallic material in a reducing atmosphere to destroy the oxide film on said nickel prior to said leaching, whereby said nickel forms a soluble ammine complex during said leaching step.

51. A process in accordance with claim 49 wherein said step of removing said solder, interliner or combination of both comprises etching them off said precious metal removed from said pregnant leach liquor.

52. A process in accordance with claim 51 wherein said precious metal is karat gold, said solder comprises silver, said interliner comprises nickel and said etching comprises treating said karat gold with nitric acid to form a solution of silver and nickel nitrates.

53. A process in accordance with claim 52 including the step of recovering said silver and said nickel from said solution.

54. A process in accordance with claim 26 wherein said bimetallic material is in the form of gold filled scrap.

55. A process in accordance with claim 54 wherein said gold filled scrap is double plate scrap and said process includes the step of reducing said scrap to pieces of a size such that sufficient surface of said base material is exposed to react with said leaching liquid.

* * * * *